(12) United States Patent
Gao (10) Patent No.: US 12,461,563 B2
(45) Date of Patent: Nov. 4, 2025

(54) ELECTRONIC DEVICE

(71) Applicant: Lenovo (Beijing) Limited, Beijing (CN)

(72) Inventor: Xiaoju Gao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/957,343

(22) Filed: Sep. 30, 2022

(65) Prior Publication Data

US 2023/0205270 A1    Jun. 29, 2023

(30) Foreign Application Priority Data

Dec. 23, 2021   (CN) .......................... 202111587028.6

(51) Int. Cl.
*G06F 1/16* (2006.01)
*G06F 3/14* (2006.01)

(52) U.S. Cl.
CPC .......... *G06F 1/1647* (2013.01); *G06F 1/1616* (2013.01); *G06F 1/1618* (2013.01); *G06F 1/1654* (2013.01); *G06F 1/1669* (2013.01); *G06F 3/1423* (2013.01); *G06F 3/1454* (2013.01)

(58) Field of Classification Search
CPC .... G06F 1/1647; G06F 1/1654; G06F 1/1669; G06F 1/1681; G06F 1/16; G06F 1/1683; G06F 3/1423; G06F 1/1632; G06F 3/1431; G06F 3/1438; G06F 3/1446; G06F 3/1454; G06F 3/1462; G06F 3/147; H04M 1/0241; H04M 1/0243; H04M 1/0245; H04M 1/0247; H04M 1/0252; H04M 1/0254; H04M 1/0256; H04M 1/0266

See application file for complete search history.

(56) References Cited

U.S. PATENT DOCUMENTS

| | | | | |
|---|---|---|---|---|
| 6,295,038 | B1 * | 9/2001 | Rebeske | G06F 1/1616 361/679.04 |
| 8,674,900 | B2 * | 3/2014 | Park | G06F 3/017 345/173 |
| 9,013,416 | B2 * | 4/2015 | Huang | G06F 3/04883 715/761 |
| 9,317,242 | B2 * | 4/2016 | Shin | G06F 1/1692 |
| 10,990,129 | B2 * | 4/2021 | Miele | G06F 1/1681 |
| 11,086,584 | B2 * | 8/2021 | Lee | G06F 1/1677 |
| 11,300,240 | B2 * | 4/2022 | Perelli | F16M 11/046 |

(Continued)

FOREIGN PATENT DOCUMENTS

TW          202117486 A  *  5/2021

*Primary Examiner* — Allen L Parker
*Assistant Examiner* — Gage Crum
(74) *Attorney, Agent, or Firm* — ANOVA LAW GROUP, PLLC (57) ABSTRACT

An electronic device includes a first body; a second body having a first display device and capable of being physically connected to or separated from the first body, where if the second body is physically connected to the first body, the second body is rotatable relative to the first body; and a third body having a second display device and capable of being physically connected to or separated from the first body, where if the second body is physically connected to the first body, the second body is rotatable relative to the first body.

21 Claims, 6 Drawing Sheets

(56) References Cited

U.S. PATENT DOCUMENTS

| | | | |
|---|---|---|---|
| 2006/0082518 A1* | 4/2006 | Ram | G06F 1/1675 345/1.1 |
| 2009/0102744 A1* | 4/2009 | Ram | G06F 1/1696 345/1.1 |
| 2011/0001687 A1* | 1/2011 | Srinivasan | G06F 3/1431 345/3.1 |
| 2012/0056919 A1* | 3/2012 | Lin | G06F 3/1423 345/204 |
| 2014/0118262 A1* | 5/2014 | Lin | G06F 1/1616 345/1.3 |
| 2014/0201653 A1* | 7/2014 | Han | G06F 3/0482 715/761 |
| 2017/0147038 A1* | 5/2017 | Cody | G06F 1/1681 |
| 2019/0004568 A1* | 1/2019 | Kaya | G06F 1/1647 |
| 2019/0164520 A1* | 5/2019 | Trim | G09G 5/06 |
| 2020/0272201 A1* | 8/2020 | Tzou | G06F 1/1677 |
| 2020/0409645 A1* | 12/2020 | Clark | G06F 3/3265 |
| 2021/0132769 A1* | 5/2021 | Parikh | G06F 1/1677 |
| 2021/0373598 A1* | 12/2021 | Chang | G06F 1/1647 |
| 2021/0405951 A1* | 12/2021 | Kumar | G06F 1/1649 |

\* cited by examiner

ELECTRONIC DEVICE

CROSS-REFERENCE TO RELATED APPLICATION

This application claims priority to Chinese Patent Application No. 202111587028.6, filed on Dec. 23, 2021, the entire content of which is incorporated herein by reference.

TECHNICAL FIELD

The present disclosure relates to the technical field of electronic technologies and, more particularly, to an electronic device.

BACKGROUND

Electronic devices are frequently used devices by people. However, current electronic devices are too simplistic to adapt various application scenarios.

SUMMARY

One aspect of the present disclosure provides an electronic device. The electronic device includes: a first body; a second body having a first display device and capable of being physically connected to or separated from the first body, where if the second body is physically connected to the first body, the second body is rotatable relative to the first body; and a third body having a second display device and capable of being physically connected to or separated from the first body, where if the second body is physically connected to the first body, the second body is rotatable relative to the first body.

Reference numerals: 100 first body, 110 first surface, 120 input device, 200 second body, 210 first display device, 220 second surface, 230 third surface, 240 first connector, 250 first wireless communication component, 300 third body, 310 second display device, 320 fourth surface, 330 fifth surface, 340 second connector, and 350 second wireless communication component.

DETAILED DESCRIPTION OF THE EMBODIMENTS

In order to make the objectives, technical solutions, and advantages of the present disclosure clearer, the present disclosure will be further described in detail below with reference to the accompanying drawings. Obviously, the described embodiments are only a part of the embodiments of the present disclosure, not all of the embodiments. Based on the embodiments of the present disclosure, all other embodiments obtained by those of ordinary skill in the art without creative efforts shall fall within the protection scope of the present disclosure.

In the description of the embodiments of the present disclosure, it should be noted that, unless otherwise stated and limited, the term "connection" should be understood in a broad sense, for example, it may be an electrical connection, an internal communication between two components, or a direct connection, and may also be indirectly connected through an intermediate medium. Those of ordinary skill in the art could understand the specific meanings of the above term according to specific situations.

It should be noted that the terms such as "first\second\third" involved in the embodiments of the present disclosure are only used to distinguish similar objects, and do not represent a specific ordering of the objects. It is understood that the terms such as "first\second\third" may be interchanged in a specific order or sequence where permitted. It should be understood that the objects distinguished by the terms such as "first\second\third" distinctions may be interchanged under appropriate circumstances so that the embodiments of the present disclosure described herein may be practiced in sequences other than those illustrated or described herein.

The electronic devices in the embodiments of the present application will be described in detail below with reference to FIGS. 1 to 11.

Figure 1:
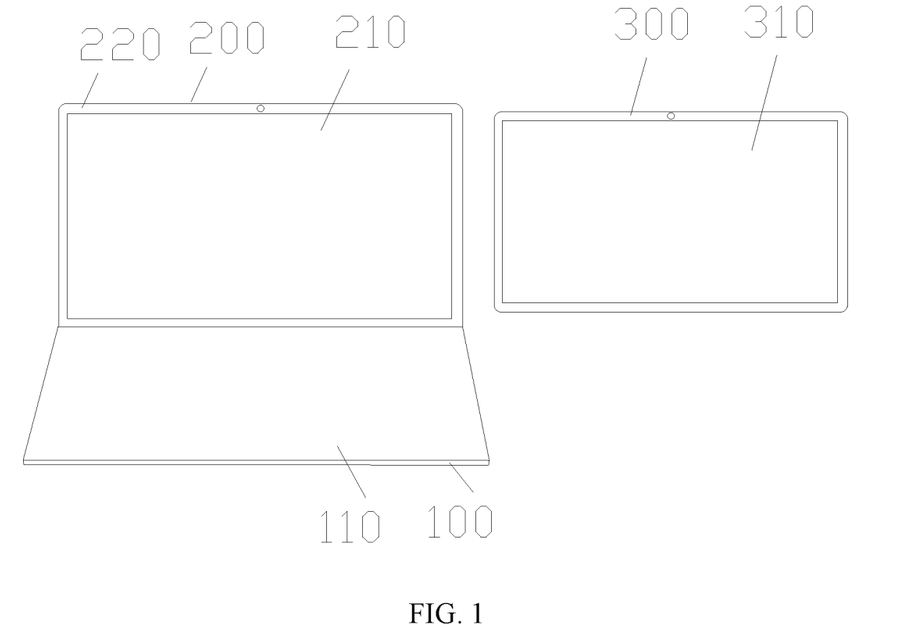
FIG. 1 is a schematic diagram of an exemplary electronic device according to some embodiments of the present disclosure.
Figure 2:
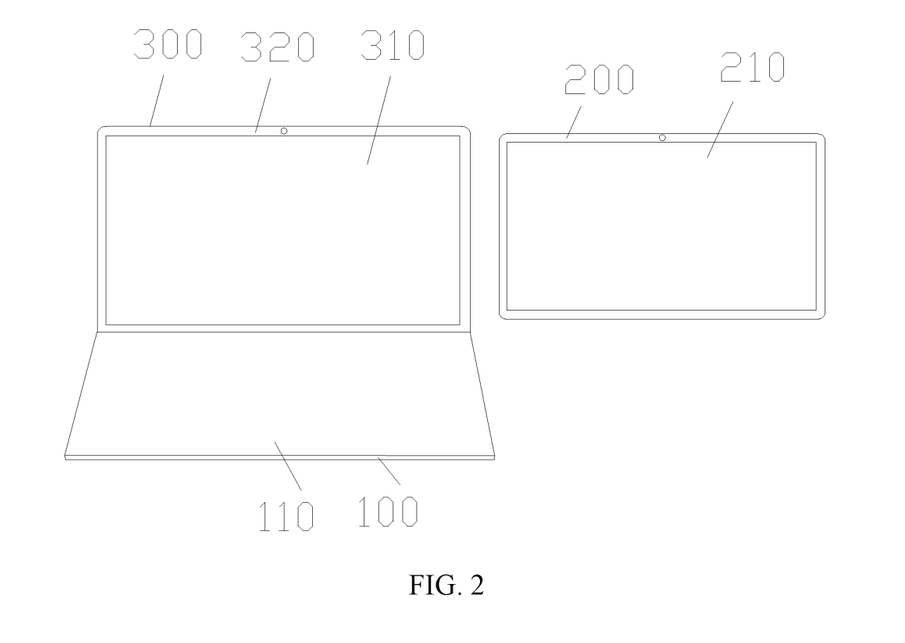
FIG. 2 is a schematic diagram of another exemplary electronic device according to some embodiments of the present disclosure.

As shown in FIG. 1, the electronic device includes a first body 100, a second body 200, and a third body 300. The second body 200 includes a first display device 210, and the second body 200 may be physically connected to or separated from the first body 100. If the second body 200 is physically connected to the first body 100, the second body 200 is rotatable relative to the first body 100, as shown in FIG. 1. The third body 300 includes a second display device 310, and the third body 300 may be physically connected or separated from the first body 100. If the third body 300 is physically connected to the first body 100, the third body 300 is rotatable relative to the first body 100, as shown in FIG. 2. Thus, the second body 200 and the third body 300 both may be physically connected to or separated from the first body 100, thereby substantially expanding application scenarios of the electronic device and improving the adaptability of the electronic device.

In the embodiments of the present disclosure, the structure of the electronic device is not limited. For example, the electronic device may be a computer or a game console.

Figure 3:
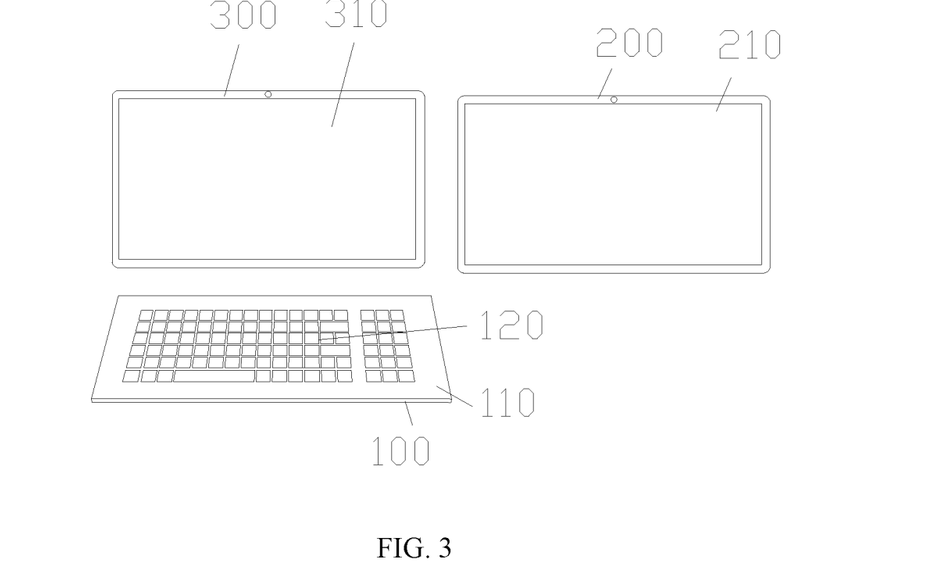
FIG. 3 is a schematic diagram of another exemplary electronic device according to some embodiments of the present disclosure.

In some embodiments, the structure of the first body 100 is not limited. For example, the first body 100 may have a plate-shaped structure, or may be a nearly plate-shaped structure. In another example, the first body 100 may include a processor. In another example, as shown in FIG. 3, the first body 100 includes an input device 120, and the input device 120 is disposed on a first surface 110 of the first body 100. In this case, the structure of the input device 120 is not limited. For example, the input device 120 may be a keyboard, a touch pad, or a touch screen with integrated display function.

In some embodiments, the structure of the second body 200 is not limited, as long as the second body 200 includes the first display device 210. For example, the second body 200 may have a plate-shaped structure, or may have a nearly plate-shaped structure. In another example, the second body 200 includes a second surface 220 and a third surface 230 disposed opposite to each other, and the first display device 210 is disposed at the second surface 220, as shown in FIG. 1.

In some embodiments, the structure of the first display device 210 is not limited. For example, the first display device 210 may be an ink screen (E-ink display). In another example, the first display device 210 may be a liquid crystal display (LCD). In another example, the first display device 210 may be an organic light emitting display (OLED).

In some embodiments, the second body 200 is physically connected to the first body 100. If the second body 200 is physically connected to the first body 100, the second body 200 is rotatable relative to the first body 100. The implementation manner of being able to rotate is not limited. For example, the first body 100 includes a connection device. The connection device is provided with a slot, into which the second body 200 can be inserted. If the second body 200 is inserted into the slot, the second body 200 is rotatable relative to the first body 100 through the connection device. In another example, the first body 100 includes the connection device. The second body 200 and the connection device may be connected by magnetic attraction. If the second body 200 and the connection device are connected by the magnetic attraction, the second body 200 is rotatable relative to the first body 100 through the connection device.

In some embodiments, the second body 200 may be physically connected with the first body 100 in a first manner, as shown in FIG. 1. After being physically connected in the first manner, the second body 200 can be rotated to an attitude such that the first display device 210 faces toward the first surface 110. In this case, the second body 200 and the first body 100 form a notebook mode. Here, the first manner can be understood as a forward connection between the second body 200 and the first body 100.

Figure 4:
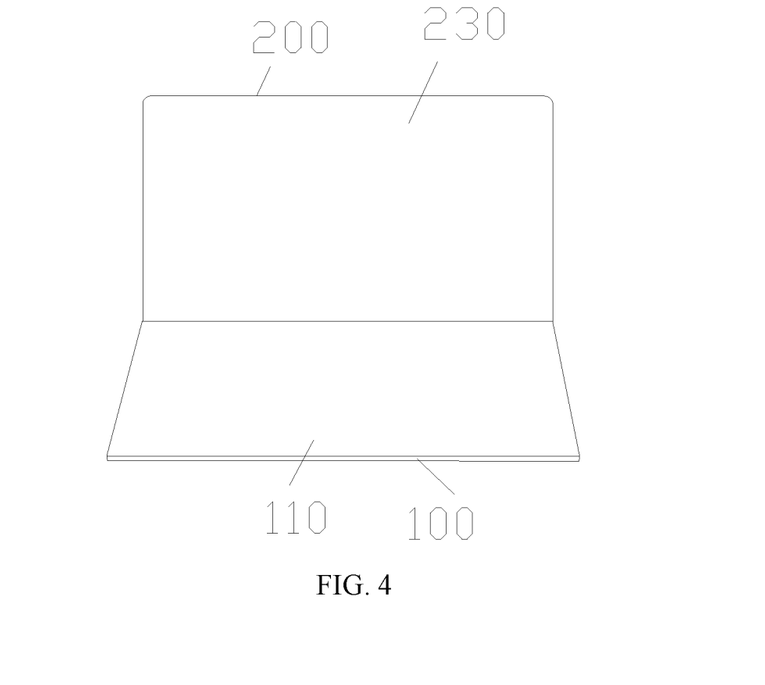
FIG. 4 is a schematic diagram of another exemplary electronic device according to some embodiments of the present disclosure.
Figure 6:
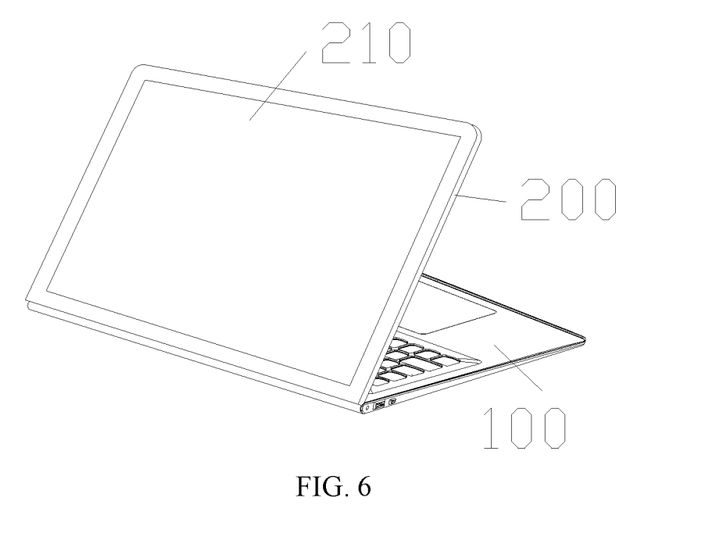
FIG. 6 is a schematic diagram of another exemplary electronic device according to some embodiments of the present disclosure.
Figure 7:
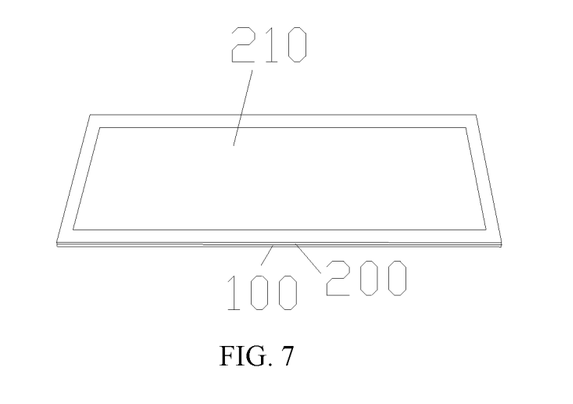
FIG. 7 is a schematic diagram of another exemplary electronic device according to some embodiments of the present disclosure.

In some embodiments, the second body 200 may be physically connected with the first body 100 in a second manner, as shown in FIG. 4. After being physically connected in the second manner, the second body 200 can be rotated to an attitude such that the third surface 230 faces toward the first surface 110. For example, as shown in FIG. 6, if an angle between the second body 200 and the first body 100 is less than 90 degrees, the second body 200 can be supported by the first body 100. At this time, the second body 200 is similar to a tablet computer, and the first body 100 is similar to a stand. In another example, as shown in FIG. 7, if the second body 200 and the first body 100 form an angle of 0 degrees, the second body 200 and the first body 100 are attached together. At this time, the second body 200 and the first body 100 together form a tablet computer mode. Here, the second manner can be understood as a reverse connection between the second body 200 and the first body 100.

In some embodiments, the second body 200 and the first body 100 can be physically connected not only in the first manner, but also in the second manner, which is not limited by the present disclosure. For example, the first body 100 includes a connection device. The connection device is provided with a slot. The second body 200 may be inserted into the slot in the forward or the reverse direction. Here, a communication method between the second body 200 and the first body 100 is not limited. For example, the slot includes a first interface component and a second interface component. If the second body 200 and the first body 100 are physically connected in the first manner, the second body 200 is communicatively connected to the first interface component by docking with the first interface component. If the second body 200 and the first body 100 are physically connected in the second manner, the second body 200 is communicatively connected to the second interface component. The first interface component and the second interface component both may be arranged at different positions on a bottom surface of the slot, and may also be arranged at two opposite sides of the slot.

In some embodiments, the structure of the third body 300 is not limited, as long as the third body 300 includes the second display device 310. For example, the third body 300 may have a plate-shaped structure, or may have a nearly plate-shaped structure. In another example, the third body 300 has a fourth surface 320 and a fifth surface 330 disposed opposite to each other, and the second display device 310 is provided with the fourth surface 320, as shown in FIG. 2. Here, the structure of the second display device 310 is not limited. For example, the second display device 310 may be the ink screen (E-ink display). In another example, the second display device 310 may be the liquid crystal display (LCD). In another example, the second display device 310 may be the organic light emitting display (OLED).

In some embodiments, the third body 300 is physically connected to the first body 100. If the third body 300 is physically connected to the first body 100, the third body 300 is rotatable relative to the first body 100. The implementation manner of being able to rotate is not limited. For example, the first body 100 includes the connection device. The connection device includes the slot. The third body 300 may be inserted into the slot. If the third body 300 is inserted into the slot, the third body 300 is rotatable relative to the first body 100 through the connection device. In another example, the first body 100 includes the connection device. The third body 300 and the connection device may be connected by the magnetic attraction. If the third body 300 and the connection device are connected by the magnetic attraction, the third body 300 is rotatable relative to the first body 100 through the connection device.

In some embodiments, the third body 300 may be physically connected with the first body 100 in a third manner, as shown in FIG. 2. After the third body 300 is physically connected in the third manner, the third body 300 can be rotated to an attitude such that the second display device 310 faces toward the first surface 110. In this case, the second body 200 and the first body 100 together form the notebook mode. Here, the third manner can be understood as the forward connection between the third body 300 and the first body 100.

Figure 5:
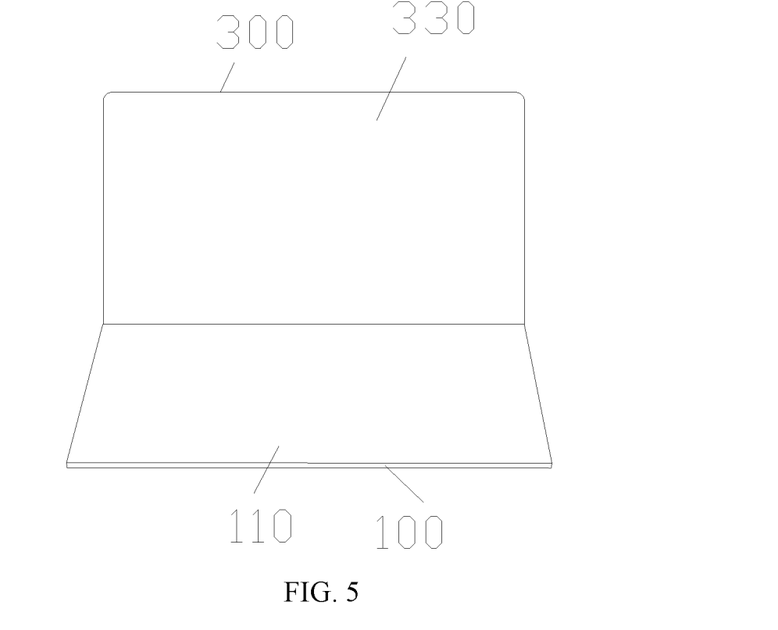
FIG. 5 is a schematic diagram of another exemplary electronic device according to some embodiments of the present disclosure.

In some embodiments, the third body 300 may be physically connected with the first body 100 in a fourth manner, as shown in FIG. 5. After the third body 300 is physically connected in the fourth manner, the third body 300 can be rotated to an attitude such that the fifth surface 330 faces toward the first surface 110. For example, if the angle between the third body 300 and the first body 100 is less than 90 degrees, the third body 300 is supported by the first body 100. At this time, the third body 300 is similar to the tablet computer, and the first body 100 is similar to the stand. In another example, if the third body 300 and the first body 100 form an angle of 0 degree, the third body 300 and the first body 100 are attached together. At this time, the third body 300 and the first body 100 together form the tablet computer mode. Here, the fourth manner can be understood as the reverse connection between the third body 300 and the first body 100.

In some embodiments, the third body 300 and the first body 100 may be physically connected not only in the third manner, but also in the fourth manner, which is not limited by the present disclosure. For example, the first body 100 includes the connection device. The connection device is provided with the slot. The third body 300 may be inserted in the slot in the forward or the reverse direction. In this case, how the third body 300 and the first body 100 are communicatively connected is not limited. For example, the first interface component and the second interface component are disposed in the slot. If the third body 300 and the first body 100 are physically connected in the third manner, the third body 300 is communicatively connected to the first interface component by docking with the first interface component. If the third body 300 and the first body 100 are physically connected in the fourth manner, the third body 300 can be communicatively connected to the second interface component by docking with each other.

The first display device 210 and the second display device 310 may be the same or different.

For example, display parameters of the first display device 210 and the second display device 310 are different. Here, the display parameters include at least one of a display size, a resolution, or a refresh rate. In another example, the first display device 210 has a first display size, the second display device 310 has a second display size, and the first display size is larger than the second display size. If more contents need to be displayed on a larger display device, the first display device 210 is selected for use. If simple file processing is required, the second display device 310 is selected for use, thereby saving power consumption and protecting eyes. In another example, the first display device 210 has a first resolution, the second display device 310 has a second resolution, and the first resolution is greater than the second resolution. If it is necessary to display images through a display device with a greater resolution, the first display device 210 is selected for use. If the simple file processing is required, the second display device 310 is selected for use, thereby saving the power consumption and protecting the eyes. In another example, the first display device 210 has a first refresh rate, the second display device 310 has a second refresh rate, and the first refresh rate is greater than the second refresh rate. If a display device with a greater refresh rate is needed to display video, the first display device 210 is selected for use. If the simple file processing is required, the second display device 310 is selected for use, thereby saving the power consumption and protecting the eyes.

For example, display power consumptions of the first display device 210 and the second display device 310 are different. In another example, the first display device 210 has a first display power consumption, the second display device 310 has a second display power consumption, and the first display power consumption is greater than the second display power consumption. The first display device 210 can be used for a longer period of time, and the second display device 310 can be used for a shorter period of time. Here, the first display device 210 may have a larger display size, a larger resolution, a larger refresh rate, or a combination thereof. The second display device 310 may have a smaller display size, a smaller resolution, a smaller refresh rate, or a combination thereof.

For example, display principles of the first display device 210 and the second display device 310 are different. Here, the display principle can be whether a display screen can be maintained in case of a power failure. In another example, the first display device 210 may be the LCD, and a displayed image disappears if the power is turned off. The second display device 310 may be the ink screen, and the displayed image remains if the power is turned off.

In some embodiments, the third body 300 and the second body 200 are separated from the first body 100 at the same time, as shown in FIG. 3. In this case, the third body 300 and the second body 200 may wirelessly communicate with the first body 100 at the same time.

In some embodiments, the second body 200 and the third body 300 are physically connected to the first body 100 at the same time, such that the electronic device has two display devices at the same time.

In some embodiments, how the second body 200 and the third body 300 are physically connected to the first body 100 at the same time is not limited.

Embodiment One

The second body 200 is physically connected to a first part of the first body 100, and the third body 300 is physically connected to a second part of the first body 100. The third surface 230 and the fifth surface 330 satisfy a condition of facing toward each other. The first display device 210 and the second display device 310 satisfy a condition of facing away from each other. The second body 200 and the third body 300 are rotatable relative to the first body 100 at the same time, such that the third body 300 and the second body 200 form a double-screen structure, and the electronic device is able to display on two screens, thereby substantially expanding the application scenarios of the electronic device and improving the adaptability of the electronic device.

In this embodiment, the condition of facing toward each other refers to a condition of facing toward each other or substantially facing toward each other. The condition of facing away from each other refers to a condition of facing away from each other or substantially facing away from each other.

In this embodiment, positions of the second body 200 and the third body 300 are not limited.

Figure 8:
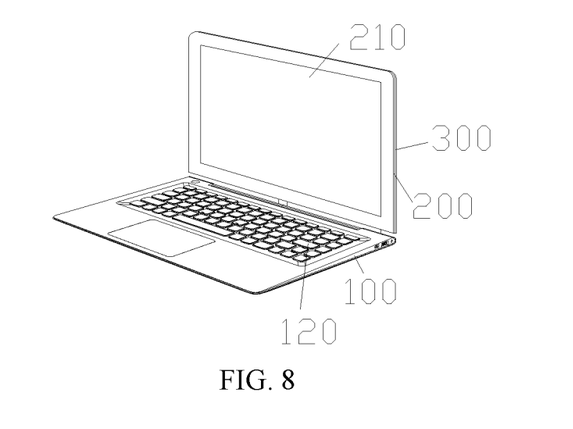
FIG. 8 is a schematic diagram of another exemplary electronic device according to some embodiments of the present disclosure.

For example, as shown in FIG. 8, the second body 200 is located on the side facing toward the first body 100. At this time, the second body 200 and the third body 300 are rotated relative to the first body 100 to an attitude such that the first display device 210 faces toward the first surface 110.

Figure 9:
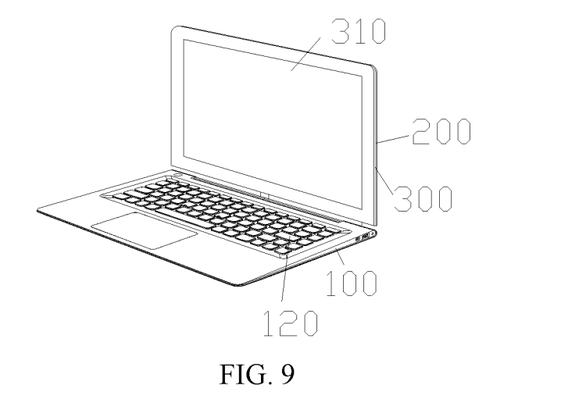
FIG. 9 is a schematic diagram of another exemplary electronic device according to some embodiments of the present disclosure.

In another example, as shown in FIG. 9, the third body 300 is located on the side facing toward the first body 100. At this time, the second body 200 and the third body 300 are rotated relative to the first body 100 to an attitude such that the second display device 310 faces toward the first surface 110.

Of course, the positions of the second body 210 and the third body 300 may be relatively fixed. For example, as shown in FIG. 8, the second body 200 is located on the side facing toward the first body 100. At this time, the electronic device is in an operation state. Here, in a normal use of the electronic device, the second body 200 is located on the side facing toward the first body 100. Here, the third body 300 cannot be located on the side facing toward the first body 100, or in case that the third body 300 is located on the side facing toward the first body 100, the third body 300 and the second body 200 cannot be used. For example, the first body 100 includes the connection device, and the connection device is provided with a slot. Only if the second body 200 is located on the side facing toward the first body 100, the second body 200 and the third body 300 can be inserted into the slot. In another example, the electronic device includes a detection device, and the detection device is used to detect a position of the second body 200. If the detection device detects that the second body 200 is located on the side facing toward the first body 100, the first body 100 supplies power to the second body 200 and the third body 300. Otherwise, the first body does not supply power to the second body 200 and the third body 300.

Figure 12:
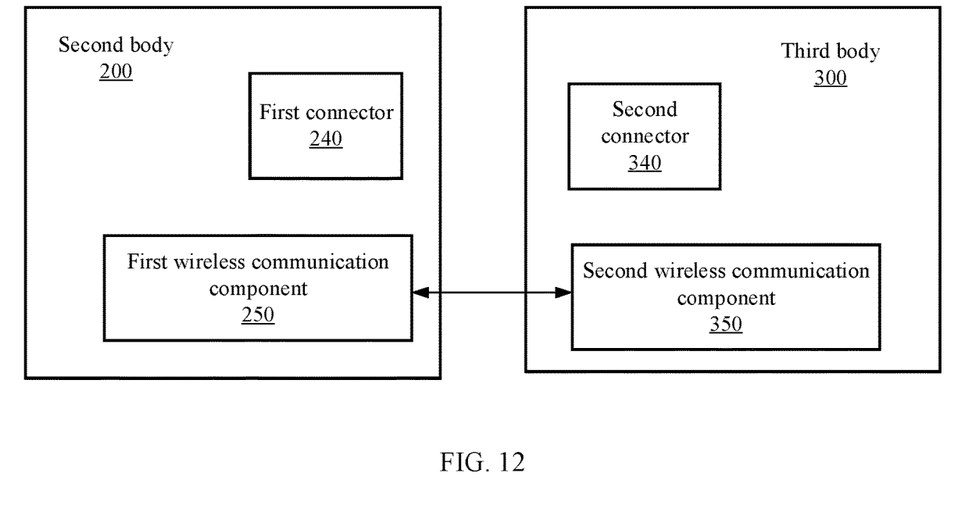
FIG. 12 is a schematic diagram of an exemplary electronic device according to some embodiments of the present disclosure.

In this embodiment, as shown in FIG. 12, the second body 200 has a first connector 240, the third body 300 has a second connector 340, and the first connector 240 and the second connector 340 can be connected. Here, structures of the first connector 240 and the second connector 340 are not limited. For example, the first connector 240 and the second connector 340 may be connected in a snap-fit manner. In another example, at least one of the first connector 240 and the second connector 340 includes a magnet, and the first connector 240 and the second connector 340 can be connected by magnetic attraction. The second body 200 and the third body 300 are connected by the first connector 240 and the second connector 340 to form an integral structure. Here, if the second body 200 and the third body 300 are separated from the first body 100, the second body 200 and the third body 300 can also form a double-screen display structure with the first display device 210 and the second display device 310 on opposite sides.

Of course, the second body 200 and the third body 300 may not be provided with the first connector 240 and the second connector 340.

In this embodiment, the first display device 210 and the second display device 310 may be displayed at the same time, or only one may be displayed. For example, the first display device 210 and the second display device 310 may simultaneously display the same content, such that different users on both sides of the electronic device can view the same content.

Embodiment Two

Figure 10:
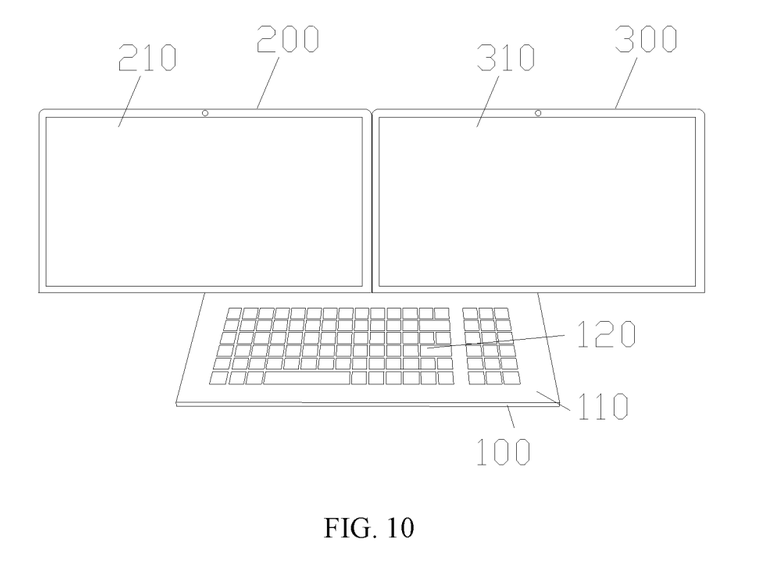
FIG. 10 is a schematic diagram of another exemplary electronic device according to some embodiments of the present disclosure.

As shown in FIG. 10, the second body 200 is physically connected to a third part of the first body 100, and the third body 300 is physically connected to a fourth part of the first body 100. The first display device 210 and the second display device 310 satisfy a coplanar condition.

In this embodiment, the second body 200 and the third body 300 are rotated relative to the first body 100 to an attitude such that at least part of the first display device 210 and at least part of the second display device 310 face toward the first surface 110. As such, the first display device 210 and the second display device 310 are facing toward the first body 100 at the same time, and the electronic device can display through the first display device 210 and the second display device 310 at the same time.

In this embodiment, positions of the second body 200 and the third body 300 are not limited. For example, as shown in FIG. 10, the second body 200 is located on a first side of the first body 100, and the third body 300 is located on a second side of the first body 100. In another example, the third body 300 is located on the first side of the first body 100, and the second body 200 is located on the second side of the first body 100.

In this embodiment, the second body has a third connector, the third body has a fourth connector, and the third connector and the fourth connector can be connected. Here, structures of the third connector and the fourth connector are not limited. For example, the third connector and the fourth connector may be connected by snapping. In another example, at least one of the third connector and the fourth connector includes a magnet, and the third connector and the fourth connector can be connected by magnetic attraction. The second body 200 and the third body 300 are connected by the third connector and the fourth connector to form an integral structure. Here, if the second body 200 and the third body 300 are separated from the first body 100, the second body 200 and the third body 300 can also form a double-screen display structure with the first display device 210 and the first display device 210 on the same side.

Of course, the second body 200 and the third body 300 may not be provided with the third connector and the fourth connector.

In this embodiment, the first display device 210 and the second display device 310 may display at the same time, or only one of them may display. For example, the first display device 210 and the second display device 310 may simultaneously display different contents for the user to view different contents.

In this embodiment, the second body 200 and the third body 300 can be communicatively connected to the first body 100 at the same time. The implementation manner of the second body 200 and the third body 300 being communicatively connected to the first body 100 at the same time is not limited.

For example, the second body 200 is physically connected to the first body 100 through wired communication, and the third body 300 is communicatively connected to the second body 200.

In another example, the first body 100 includes a connection device, and the connection device is provided with a slot. The third body 300 and the second body 200 can be inserted into the slot at the same time. The slot includes a third interface component and a fourth interface component. The third body 300 is docked with the third interface component to be able to communicate with the first body 100, and the second body 200 is docked with the fourth interface component to be able to communicate with the first body 100.

In another example, one of the second body 200 and the third body 300 is physically connected to the first body 100 through wired communication, and the other of the second body 200 and the third body 300 is connected to the first body 100 through wireless communication.

In another example, the first body 100 includes a connection device, and the connection device is provided with a slot. The third body 300 and the second body 200 can be inserted into the slot at the same time. The slot includes the third interface component. One of the second body 200 and the third body 300 is docked with the third interface component to be able to communicate with the first body 100, and the other of the second body 200 and the third body 300 is connected to the first body 100 through wireless communication.

In another example, one of the second body 200 and the third body 300 is physically connected to the first body 100 through wired communication, and the third body 300 and the second body 200 are communicatively connected.

Here, the implementation manner in which one of the second body 200 and the third body 300 is physically connected to the first body 100 through wired communication has been described above, and details are not repeated herein.

Here, the implementation manner of the communication connection between the third body 300 and the second body 200 is not limited. For example, the third body 300 and the second body 200 may be physically connected through wired communication. In another example, the third body 300 and the second body 200 may be connected through wireless communication.

In another example, as shown in FIGS. 8 and 9, if the third surface 230 and the fifth surface 330 satisfy the condition of facing toward each other, the third surface 230 has a first wired communication component, the fifth surface 330 has a second wired communication component, and the first wired communication component and the second wired communication component are connected with each other, such that the second body 200 and the third body 300 are connected through wired communication by the first wired communication component and the second wired communication component. In another example, as shown in FIG. 12, the third surface 230 includes a first wireless communication component 250 capable of transmitting wireless data in at least a first direction, and the fifth surface 330 includes a second wireless communication component 350 located at least in the first direction of the first wireless communication component 250. The second body 200 and the third body 300 can be connected through wireless communication by the first wireless communication component 250 and the second wireless communication component 350.

Figure 11:
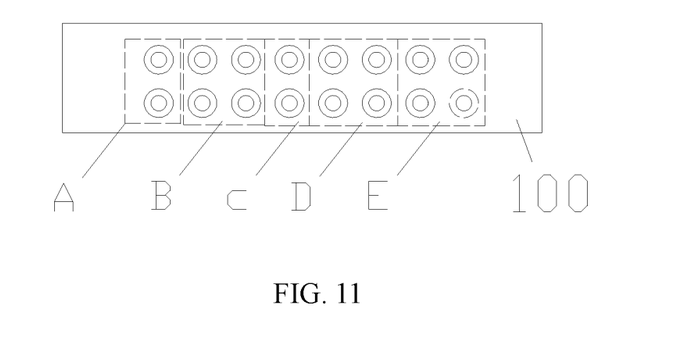
FIG. 11 is a partial view of an exemplary electronic device according to some embodiments of the present disclosure.

In some embodiments, as shown in FIG. 11, two rows of the third interface components are disposed at a bottom of the slot. The third interface components in area A are used for grounding. The third interface components in area B are used for transmitting display data. The third interface components in area C are used for identifying which of the second body 200 and the third body 300 faces toward the first body 100. The third interface components in area D are used for transmit data other than the display data. The third interface components in area E are used for supplying power. The second body 200 includes a row of fifth interface components, and the third body 300 includes a row of sixth interface components. If the second body 200 and the third body 300 are physically connected to the first body 100 in the manner shown in FIG. 8, the row of the fifth interface components is docked with one of the two rows of the third interface components, and the row of the sixth interface components is docked with the other of the two rows of the third interface components. If the third interface components are docked with the fifth interface components and the sixth interface components respectively, it can be determined whether the second body 200 faces toward the first body 100. At this time, the third interface components in area B are used for docking with the fifth interface components to transmit the display data. The second body 200 and the third body 300 are communicatively connected. How the second body 200 and the third body 300 are physically connected to the first body 100 as shown in FIG. 9 is similar to how the second body 200 and the third body 300 are physically connected to the first body 100 as shown in FIG. 8, and hence will not be repeated herein.

In some embodiments, the electronic device further includes a processor. The processor is used to control the display device.

In the embodiments of the present disclosure, the manner in which the processor is used to control the display device is not limited.

For example, if the second body 200 and the first body 100 are physically connected in the first manner or physically connected in the second manner, the processor is configured to control the first display device 210 to display. Here, if the second body 200 and the first body 100 are physically connected in the first manner, the processor is used to control the first display device 210 to display a first content. If the second body 200 and the first body 100 are connected in the second manner, the processor is configured to control the first display device 210 to display a second content. The first content and the second content may be different. For example, the first content may be text information, and the second content may be image information.

In another example, if the third body 300 and the first body 100 are physically connected with the first body 100 in the third manner or the fourth manner, the processor is configured to control the second display device 310 to display. Here, if the third body 300 and the first body 100 are physically connected in the third way, the processor is configured to control the first display device 210 to display a third content. If the third body 300 and the first body 100 are physically connected in the fourth manner, the processor is configured to control the first display device 210 to display a fourth content. The third content and the fourth content may be different. For example, the third content may be text information, and the fourth content may be image information.

In another example, if the second body 200 and the third body 300 are both physically connected to the first body 100, the processor is configured to control the first display device 210 and/or the second display device 310 to display. As such, the application scenarios of the electronic device are expanded, thereby substantially improving the adaptability of the electronic device. For example, if orientations of the first display device and the second display device satisfy the condition of facing away from each other, and the first display device 210 faces toward the first body 100, the processor is configured to control the first display device 210 to display, or control the second display device 310 to display. Of course, the processor may be configured to control the first display device 210 and the second display device 310 to display simultaneously, and here, the first display device 210 and the second display device 310 may display the same content or different content. As yet another example, if the first display device and the second display device satisfy the coplanarity condition, the processor may be configured to control the first display device 210 and the second display device 310 to display simultaneously. Here, the first display device 210 and the second display device 310 may display a same content, or may display different contents.

In this embodiment, an implementation manner used by the processor to determine whether the second body 200 and the first body 100 are physically connected in the first manner or in the second manner is not limited. For example, the processor determines through the first interface component that the second body 200 and the first body 100 are physically connected in the first manner, and the processor determines through the second interface component that the second body 200 and the first body 100 are physically connected in the second manner.

In this embodiment, the implementation manner used by the processor to determine whether the third body 300 and the first body 100 are physically connected in the third manner or in the fourth manner is not limited. For example, the processor determines through the first interface component that the third body 300 and the first body 100 are physically connected in the third manner, and the processor determines through the second interface component that the third body 300 and the first body 100 are physically connected in the fourth manner.

It should be noted that, since the second body 200 and the third body 300 are different, the processor may identify whether the second body 200 or the third body 300 is connected thereto through the first interface component and the second interface component.

In this embodiment, the processor is configured to control at least one of the first display device 210 and the second display device 310 if it is determined that both the second body 200 and the third body 300 are physically connected to the first body 100. For example, the processor determines through the third interface component that the second body 200 and the third body 300 are connected to the first body 100 as shown in FIG. 8. The processor is configured to control at least one of the first display device 210 and the second display device 310. At this time, the processor may only control the first display device 210 to display, or only control the second display device 310 to display, or simultaneously control the first display device 210 and the second display device 310 to display a same content or different contents.

In this embodiment, the processor is further configured to control the first body 100 to be in a sleep mode to save power if it is determined that both the second body 200 and the third body 300 are separated from the first body 100, as shown in FIG. 3.

In the embodiments of the present disclosure, the electronic device includes the first body 100, the second body 200, and the third body 300. The second body 200 includes the first display device 210, and the second body 200 may be physically connected to or separated from the first body 100. If the second body 200 is physically connected to the first body 100, the second body 200 is rotatable relative to the first body 100. The second body 200 includes the second display device 310, and the second body 200 may be physically connected or separated from the first body 100. If the third body 300 is physically connected to the first body 100, the third body 300 is rotatable relative to the first body 100. Thus, both the second body 200 and the third body 300 may be physically connected or separated from the first body 100, thereby substantially expanding the application scenarios of the electronic device and improving the adaptability of the electronic device.

The above are only specific embodiments of the present application, but the protection scope of the present application is not limited to this, should be covered within the scope of protection of this application. Therefore, the protection scope of the present application should be subject to the protection scope of the claims.

Although the embodiments of the present disclosure have been described, additional changes and modifications to these embodiments may occur to those skilled in the art once the basic inventive concepts are known. Therefore, the appended claims are intended to be construed to include the embodiments and all changes and modifications that fall within the scope of the present disclosure.

It will be apparent to those skilled in the art that various modifications and variations can be made in the present disclosure without departing from the spirit and scope of the disclosure. Thus, if these modifications and variations of the present disclosure fall within the scope of the claims of the present application and their equivalents, the present disclosure is also intended to include these modifications and variations.

What is claimed is:

1. An electronic device, comprising:
a first body including interface components;
a second body having a first display device and capable of being physically connected to or separated from the first body, wherein if the second body is physically connected to the first body, the second body is rotatable relative to the first body; and
a third body having a second display device and capable of being physically connected to or separated from the first body, wherein if the third body is physically connected to the first body, the third body is rotatable relative to the first body;
wherein:
 the interface components include an area for identifying which of the second body and the third body faces toward the first body; and
 the second body and the third body are configured to connect to the first body in a planar side-by-side configuration and in a back-to-back configuration, and in the back-to-back configuration, the first body stops supplying power to the second body and the third body in response to detecting that the first display device faces away from the first body.

2. The electronic device according to claim 1, wherein:
the first body includes an input device disposed at a first surface of the first body;
the second body includes a second surface and a third surface facing away from the second surface, the first display device is disposed at the second surface;
if the second body is physically connected to the first body in a first manner, the second body is able to be rotated to an attitude such that the first display device faces toward the first surface;
if the second body is physically connected to the first body in a second manner, the second body is able to be rotated to an attitude such that the third surface faces toward the first surface;
the third body includes a fourth surface and a fifth surface facing way from the fourth surface, the second display device is disposed at the fourth surface, and the third body is physically connected to the first body in a third manner or a fourth manner;
if the third body is physically connected to the first body in the third manner, the third body is able to be rotated to an attitude such that the second display device faces toward the first surface; and
if the third body is physically connected to the first body in the fourth manner, the third body is able to be rotated to an attitude such that the fifth surface faces toward the first surface.

3. The electronic device according to claim 2, wherein:
the second body and the third body are able to be physically connected to the first body at the same time.

4. The electronic device according to claim 3, wherein:
the second body is physically connected to a first part of the first body;
the third body is physically connected to a second part of the first body;
the third surface and the fifth surface satisfy the condition of facing toward each other;
orientations of the first display device and the second display device satisfy the condition of facing away from each other; and
the second body and the third body are simultaneously rotatable relative to the first body.

5. The electronic device according to claim 4, wherein:
the second body includes the first connector;
the third body includes the second connector; and
the first connector and the second connector are able to be connected.

6. The electronic device according to claim 3, wherein:
the second body is physically connected to a third part of the first body;
the third body is physically connected to a fourth part of the first body; and
the first display device and the second display device satisfy the coplanar condition.

7. The electronic device according to claim 3, wherein:
the second body and the first body are physically connected and communicatively connected through wired communication, and the third body and the first body are physically connected and communicatively connected through the wired communication; or
one of the second body and the third body is physically connected to the first body and communicatively connected to the first body through wired communication, and the third body and the second body are physically connected and communicatively connected through the wired communication; or
one of the second body and the third body is physically connected to the first body and communicatively connected to the first body through wired communication, and the other of the second body and the third second body is communicatively connected to the first body through the wireless communication.

8. The electronic device according to claim 7, wherein if the third surface and the fifth surface satisfy the condition of facing toward each other:
the third surface includes the first wired communication component, the fifth surface includes the second wired communication component, and the first wired communication component and the second wired communication component are able to be connected together, such that the second body and the third body are communicatively connected through the first wired communication component and the second wired communication component; or
the third surface incudes the first wireless communication component capable of transmitting wireless data in at least the first direction, the fifth surface includes the second wireless communication component located at least in the first direction of the first wireless communication component, and the second body and the third body communicate with each other through the wireless communication by the first wireless communication component and the second wireless communication component.

9. The electronic device according to claim 3, further comprising:
a processor configured to control display devices in at least one of three scenarios:
if the second body and the first body are physically connected in the first manner or the second manner, the processor is configured to control the first display device to display; or
if the third body and the first body are physically connected in the third manner or the fourth manner, the processor is configured to control the second display device to display; or
if the second body and the third body both are physically connected to the first body, the processor is configured to control the first display device and/or the second display device to display.

10. The electronic device according to claim 1, wherein:
the first display device and the second display device have different display parameters; or
the first display device and the second display device have different display principles.

11. The electronic device according to claim 1, wherein:
the second body and the third body are able to be physically connected to the first body at the same time.

12. The electronic device according to claim 11, wherein:
the second body is physically connected to a first part of the first body;
the third body is physically connected to a second part of the first body;
a third surface of the second body and a fifth surface of the third body satisfy a condition of facing toward each other;
orientations of the first display device and the second display device satisfy a condition of facing away from each other; and
the second body and the third body are simultaneously rotatable relative to the first body.

13. The electronic device according to claim 12, wherein:
the second body includes a first connector;
the third body includes a second connector; and
the first connector and the second connector are able to be connected.

14. The electronic device according to claim 11, wherein:
the second body is physically connected to a third part of the first body;
the third body is physically connected to a fourth part of the first body; and
the first display device and the second display device satisfy a coplanar condition.

15. The electronic device according to claim 11, wherein:
the second body and the first body are physically connected and communicatively connected through wired communication, and the third body and the first body are physically connected and communicatively connected through wired communication; or
one of the second body and the third body is physically connected to the first body and communicatively connected to the first body through wired communication, and the third body and the second body are physically connected and communicatively connected through wired communication; or
one of the second body and the third body is physically connected to the first body and communicatively connected to the first body through wired communication, and the other of the second body and the third second body is communicatively connected to the first body through wireless communication.

16. The electronic device according to claim 15, wherein if a third surface of the second body and a fifth surface of the third body satisfy the condition of facing toward each other:
the third surface includes a first wired communication component, the fifth surface includes a second wired communication component, and the first wired communication component and the second wired communication component are able to be connected together, such that the second body and the third body are communicatively connected through the first wired communication component and the second wired communication component; or
the third surface incudes a first wireless communication component capable of transmitting wireless data in at least a first direction, the fifth surface includes a second wireless communication component located at least in the first direction of the first wireless communication component, and the second body and the third body communicate with each other through wireless communication by the first wireless communication component and the second wireless communication component.

17. The electronic device according to claim 11, further comprising:
a processor configured to control display devices in at least one of three scenarios:
if the second body and the first body are physically connected in the first manner or the second manner, the processor is configured to control the first display device to display; or
if the third body and the first body are physically connected in the third manner or the fourth manner, the processor is configured to control the second display device to display; or
if the second body and the third body both are physically connected to the first body, the processor is configured to control the first display device and/or the second display device to display.

18. The electronic device according to claim 1, wherein: one of the first display device and the second display device is an ink screen.

19. The electronic device according to claim 1, wherein the first body is controlled to be in a sleep mode in response to determining that both the second body and the third body are separated from the first body.

20. An electronic device, comprising:
a first body including interface components;
a second body having a first display device and capable of being physically connected to or separated from the first body, wherein if the second body is physically connected to the first body, the second body is rotatable relative to the first body; and
a third body having a second display device and capable of being physically connected to or separated from the first body, wherein if the third body is physically connected to the first body, the third body is rotatable relative to the first body;
wherein;
the interface components include an area for identifying which of the second body and the third body faces toward the first body;
the second body and the third body are configured to connect to the first body in a planar side-by-side configuration and in a back-to-back configuration, and in the back-to-back configuration, the first body displays content with different display resolutions on the second body and the third body when the first display device is facing the first body and the second display device is facing away from the first body, the second body and the third body being interchangeable with each other in the back-to-back configuration; and
the first body stops supplying power to the second body and the third body in response to detecting that the first display device faces away from the first body.

21. The electronic device of claim 20, wherein the second body and third body in the back-to-back configuration are switched based on display resolutions of the first display device and the second display device.

* * * * *